Patented Oct. 19, 1943

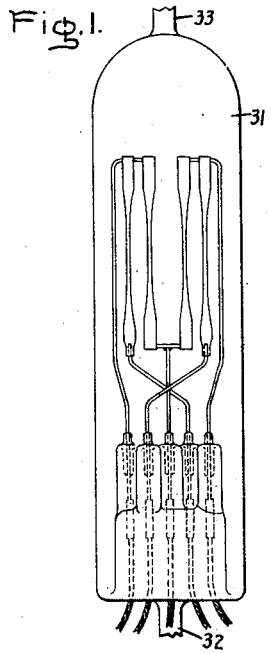
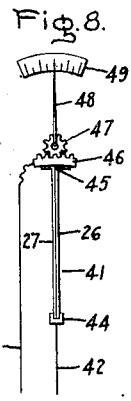
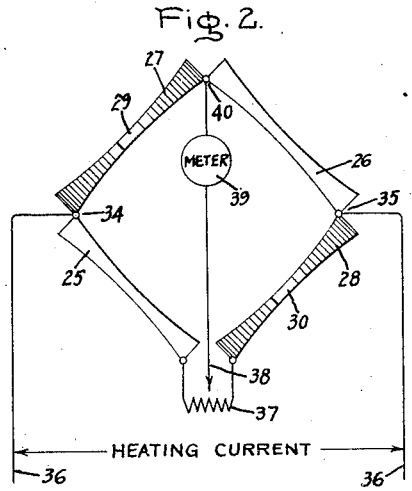
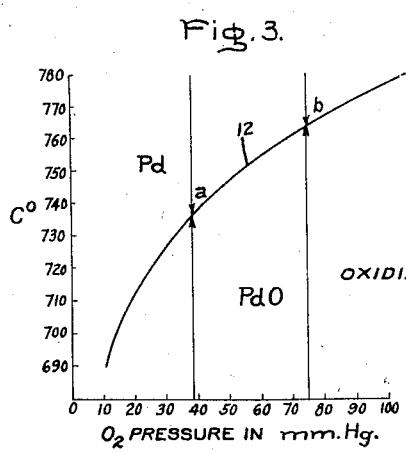
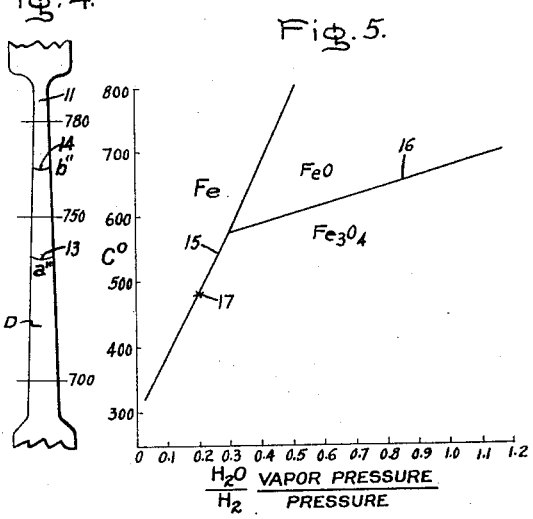
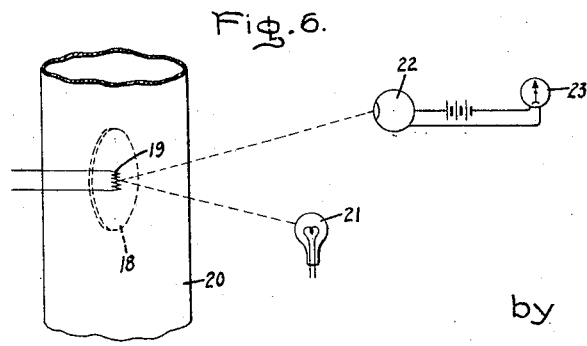
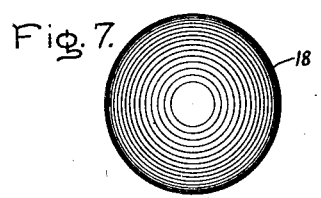
Inventor:
Francis J. Norton,
by Harry E. Dunham
His Attorney.

2,332,337

UNITED STATES PATENT OFFICE 2,332,337

GAS ANALYZER

Francis J. Norton, Schenectady, N. Y., assignor to General Electric Company, a corporation of New York Application July 1, 1939, Serial No. 282,418

12 Claims. (Cl. 23—232)

My invention relates to gas responsive apparatus and methods of analysis, and concerns particularly apparatus for giving a quantitative measurement of the percentage of a given gas in a mixture of gases.

It is an object of my invention to provide an improved, simplified apparatus and method for gas analysis in which definite accurate indications may readily be obtained.

The objects of my invention include the utilization for gas analysis of equilibrium reactions between gases and metals. More specific objects of my invention are to provide methods and apparatus for measuring oxygen, particularly excess oxygen, in the exit gases of boilers in central stations in controlling combustion, and for measuring percentages of hydrogen in hydrogen atmospheres.

Other and further objects and advantages will become apparent as the description proceeds.

In carrying out my invention in its preferred form a suitable metal is exposed to a gas mixture to be analyzed and so arranged that it will have a temperature gradient such that an equilibrium reaction with the active gas constituent of the atmosphere to be analyzed will take place and the temperature point at which the reaction is in equilibrium will indicate the percentage of active gas in the mixture. In the case of determination of the oxygen content in gas mixtures one portion of a non-uniformly heated metal will be in one state, that is oxidized, and another portion will be in another state, that is bright or non-oxidized, and the position of the sharp dividing line between these two areas serves as a measure of the gas composition.

The invention will be understood more readily from the following detailed description when considered in connection with the accompanying drawing and those features of the invention which are believed to be novel and patentable will be pointed out in the claims appended hereto, except for certain features of the invention which are claimed in my Patent No. 2,307,800, issued January 12, 1943, and assigned to the same assignee as my present invention. In the drawing Figure 1 is a side view of apparatus forming one embodiment of my invention with the electrical connections omitted. Figure 2 is a circuit diagram of the apparatus of Figure 1 showing portions thereof schematically. Figure 3 is a graph explaining the principle of operation of one embodiment of the invention. Figure 4 is a plan view of another embodiment of the invention placed on the sheet with its temperature scale in line with that of the graph of Figure 3. Figure 5 is a graph illustrating the principle of operation of my invention in connection with the analysis of different gas from that represented in Figure 3. Figure 6 is a schematic diagram of still another embodiment of my invention. Figure 7 is a detail plan view of the heated disk utilized in the apparatus of Figure 6 and Figure 8 is a schematic diagram of an embodiment of my invention operating on the bimetallic principle.

Although my invention is applicable to the analysis of various different gases, its principle will, for the sake of illustration, be explained in greatest detail in connection with the determination of oxygen content in gases. In central station operation, it is important to control combustion and have a minimum amount of excess oxygen in the exit gases. My invention lends itself to a convenient and continuous indication of the exact oxygen content. A strip of a suitable metal exposed to the gas to be analyzed is heated in such a manner that the temperature varies progressively along the length of the strip, and the position of the line of demarcation between the portion of the material at its surface which is combined with the gas and the portion which is not combined with the gas is determined in order to obtain a measure of the gas content. The strip may be conveniently heated by its own resistance as a result of passing current through it. In order to obtain a temperature gradient along the length of the strip, the strip may be tapered, as illustrated by the strip 11 shown in Figure 4, or may be tapered symmetrically as are the strips in Figure 1. For oxygen analysis the strip is composed of a suitable material, such as palladium, for example, which has an equilibrium reaction with oxygen varying according to temperature.

In Figure 3, the curve 12 represents the relationship between the dissociation pressure of palladium oxide and temperature. Curve 12 is plotted with degrees of temperature centigrade along the vertical axis and millimeters of mercury dissociation pressure along the horizontal axis. It will be apparent that, for any temperature above or to the left of the curve, palladium and oxygen do not combine or remain in combination and the palladium remains bright, whereas for any temperature below the curve or any to the right of the curve palladium and oxygen combine and the strip of palladium is darkened by oxidation of its surface. If a gas mixture of nitrogen and oxygen containing 5% oxygen by volume, or a partial pressure of 38 mm. of oxygen (point $a$), is passed over the non-uniformly heated strip 11, all the points on the strip below $a''$ which is at 736° centigrade will be oxidized since they are below the dissociation pressure of palladium oxide at 736° centigrade, which is 38 mm. All points above $a''$ on the strip will be bright, since they are above the dissociation temperature of 736° centigrade at 38 mm. Line 13 at $a''$ constitutes an isothermal equilibrium line of dissociation pressure 38 mm. and indicates an oxygen content of 5%.

If the gas composition is changed to 10% oxygen, 90% nitrogen, or a partial pressure of 76 mm. oxygen, the equilibrium line on the strip moves up to point $b''$ which is at 764° centigrade where the dissociation pressure of palladium oxide is 76 mm. The line 14 at $b''$ indicates that there is sufficient oxygen for a dissociation pressure of 76 mm. or 10% oxygen. The movement of the equilibrium line constitutes a pointer along a temperature scale and gives a quantitative measure of oxygen in the gas mixture. All points below the line are dark, due to oxide, and all points above are bright due to unoxidized metal. By referring to the graph of Figure 3 and bearing in mind that the ratio of partial pressure of the oxygen in a gas mixture to atmospheric pressure equals the fraction of oxygen in the mixture measured by volume or in gram-molecules, the distances along the strip 11 corresponding to different percentages of oxygen may be determined and a suitable scale may be placed beside the strip 11 so that direct readings of oxygen percentage may be obtained.

In an exactly similar way an iron strip can be used to indicate the composition of mixtures of water vapor or steam and hydrogen. In the graph of Figure 5, the curve 15 represents the relationship between the ratio of water to hydrogen in the surrounding atmosphere and the temperature at which iron oxide dissociates. Curve 16 represents the relationship between the ratio and the temperature at which iron oxide passes from FeO to $Fe_3O_4$ and vice-versa. The curves are plotted with degrees of temperature centigrade along the vertical axis and the ratio of water vapor pressure to hydrogen pressure along the horizontal axis. The line 15 on the equilibrium diagram is the one marking the dark oxide, bright metal boundary, and changes in water content of hydrogen can be followed just as the oxygen content was followed on a palladium strip. The area to the left of the line 15 represents a bright condition of the iron, whereas the area to the right representing the oxide condition is divided into two parts with the one above the line 16 representing FeO and that below the line 16 representing $Fe_3O_4$. In either case, however, the region to the right of the line 15 represents oxidation. The point 17 along the line 15 representing an $H_2O/H_2$ ratio of 2/10, has an equilibrium temperature of 480° centigrade, and this will be marked by a line on the strip, such as the strip 11, with dark iron oxide at temperatures below 430° centigrade and a bright reduced iron surface at temperatures above 480° centigrade.

Although I have described the invention for the sake of illustration in connection with the analysis of two different specific types of gas mixtures and utilizing two different specific metals, it will be understood that my invention is not limited thereto, and includes analysis of any gas which has an equilibrium reaction with a solid material varying in accordance with variations in temperature. For example, in the analysis of hydrogen sulphide, equilibria involving sulphides instead of oxides would be employed and in connection with carbon dioxide analysis oxidation by carbon dioxide instead of oxygen may be used.

My invention is not limited to the mere indication of percentages of various mixtures, and may readily be employed in connection with relay and control arrangements for correcting gas percentages to maintain a predetermined relationship. In utilizing electrical control actuated by a gas indicator in accordance with my invention, the arrangement of Figure 6, for example, may be employed in which a disk 18 is heated at the center in any suitable manner as by means of an electrical resistor 19 attached thereto or current is passed through the center of the disk itself, and the disk 18 is placed within a tube 20 through which the gas to be analyzed is passed. Considered as an oxygen content analyzer, variations in the gas content will produce an oxide ring on the disk 18 like an iris diaphragm varying with changing gas composition. As shown in Figure 7 the outer oxidized portion of the disk 18 will form a dark ring, whereas the center unoxidized portion will form a bright circle, the area of which latter increases as the oxygen content decreases. The bright area may be measured in any suitable manner as by reflection of light from a lamp 21 impinging upon a photocell 22 or a photoelectric relay device. As will be well understood by those skilled in the art, the output of the photocell 22 varies with the amount of light received thereby, and a suitable current responsive device, such as a measuring instrument or relay 23 may be provided for giving indications of oxygen content or for operating controlling apparatus, not shown, for restoring conditions of controlled apparatus to bring about the desired oxygen ratio.

In utilizing my invention in connection with the use of controlled gas atmospheres for bright annealing of steel, for example, a strip such as that shown in Figure 4 is employed to indicate to what extent and to what temperatures the atmosphere is reducing and just where oxidation will start, as was described for the iron strip. The strip may be heated either indirectly or directly, e. g. by passing current through it as already explained. The strip is of the same composition as the steel which is to be annealed and microscopic examination, after polishing and etching such a heated strip, will tell to what extent and at what temperatures carburization or decarburization has taken place in that particular gas atmosphere and for the particular steel used for the strip. After such a calibration for carburization, the position of a discontinuity on the heated tapered strip will tell the temperature at which the effect is taking place. The original line of demarcation may not be as sharp as in the case of oxygen analysis in flue gases, previously discussed, but after calibration of the strip polishing, etching and microscopic examination will be unnecessary except for exceedingly precise determinations.

Another electrical arrangement for obtaining deflecting-pointer indication or for controlling electrical circuits in accordance with variations in gas analysis is shown in Figures 1 and 2. In this embodiment of my invention a Wheatstone bridge is constructed, composed of two opposite arms 25 and 26 of a relatively inert metal, such as platinum, and two other opposite arms 27 and 28 of a metal having an equilibrium reaction with the active constituent of the gas to be analyzed, for example, palladium, in the case of oxygen analysis. The strips 27 and 28 are tapered, for example, being tapered toward the centers 29 and 30 so that when electrical current is passed through the strip the center will be at the highest temperature. The platinum strips 25 and 26 need not be tapered, but for reasons hereinafter explained preferably have substantially the same shape as the strips 27 and 28. An arrangement is provided for directing the flow of gas in a confined path or in a stream, and the palladium strips are so located as to be within the stream of gas. For example, the four strips constituting the Wheatstone bridge may be mounted within a tube 31 having an inlet 32 and an outlet 33 through which gas to be analyzed is passed so as to pass over the palladium strips 27 and 28. Two opposite points 34 and 35 of the Wheatstone bridge are connected to a suitable source of current 36 which serves both to heat the bridge arms and to permit determination of electrical balance of the bridge by means of an electrical instrument. Preferably for the sake of adjusting the bridge a resistor 37 is provided between two of the adjacent arms of the bridge, for example, the strips 25 and 28 and an adjustable tap 38 serves as one of the ends of the diagonal arm of the bridge. For determining bridge balance, a current responsive device, such as a measuring instrument or a relay 39 is provided which is connected between the adjustable tap 38 and the opposite diagonal point 40 of the bridge so that the device 39 serves as a diagonal arm of the bridge.

As explained in connection with the apparatus of Figure 4, variations in oxygen content of the gas passing through the tube 31 result in the formation of greater or less amounts of oxide surface along the tapered portion of the strips 27 and 28 causing the lengths of the bright portions 29 and 30 to vary accordingly. The variation in the relative lengths of the bright and dark portions of the strips 27 and 28 changes the heat radiated by the strips since the oxidation increases the thermal emissive power of the metal surface. The increase in the heat radiated results in a decrease in temperature of the strip and consequently a reduction in the resistance thereof. The resultant unbalance of the bridge measured by the instrument 39 depends upon the oxygen content and accordingly the instrument 39 may be calibrated in terms of oxygen percentage. Such factors as ambient temperature and thermal conductivity of the gas, unrelated to oxygen content, are balanced out by virtue of the use of the platinum strips 25 and 26 of similar dimensions and resistance to the strips 27 and 28. The strips 27 and 28 (like the strip 11 of Fig. 4) serve in this case as heating units having different heat output in different parts thereof, the heating rate obviously being greatest in the narrow portion at the middle and least at the wide ends which serves as terminals. The actual composition of the strips for the purpose of serving as heating units is relatively unimportant provided the physical characteristics are such that the material will not be destroyed at the temperatures used and a resistivity is of the order of magnitude permitting the desired temperature to be attained in units of convenient size drawing a value of electrical current which is convenient to supply. The surface metal which is exposed to the gaseous mixture to be analyzed and which is in thermal connection or contact with the underlying metallic material must be of such composition as to react with one of the gases in the mixture to be analyzed and to have this reaction dependent upon temperature as previously explained. In most cases it will be most convenient to have the surface metal and the underlying metal comprising the heating unit integral or composed of the same metal or composition. It is to be observed, however, that each of the strips 11, 27 and 28 actually includes two different elements having different functions, viz: the heating unit having different heat outputs along its length and the surface metal in thermal contact with the heating unit raised to different temperatures in different parts of the surface and therefore having different emissivity, different surface appearance and different coefficient of reflection at the parts of the surface having different temperatures.

In the arrangement of Figs. 6 and 7 the heating unit 19 is not shown as integral with the surface metal but is in thermal contact with a portion of the plate 18, which bears the reactive surface metal. Heating this portion of the plate more intensely than the other portions raises the said portion to a higher temperature than the other portions of the plate and thus different portions of the surface metal have different temperatures. As in the case of Figs. 1, 2 and 4 the different temperatures of the surface metal result in differences in surface appearance, emissivity, heat radiation and light reflection Instead of arranging the platinum and palladium strips or other dissimilar strips as the arms of a Wheatstone bridge as illustrated in Figures 1 and 2, strips of two different metals, such as platinum and palladium may be welded or otherwise joined together back to back to form a bimetal strip 41, as illustrated in Figure 8. The bimetal strip 41 may be heated in any desired manner as by passing a current through it by means of electric leads 42 and 43, the latter of which is flexible in order that the bimetallic strip 41 may be supported from one end, e. g., the lower end 44 and permit the other end 45 to deflect. As previously explained, the bimetallic strip may be tapered and the changes in extent of oxidized surface and emissivity of the palladium surface 27 in response to variations in gas composition will vary the temperature of the palladium strip 27, thus varying the degree of expansion and causing the end 45 of the strip 41 to deflect in one direction or the other according to the gas composition. An increase in extent of darkened surface, indicating increased oxygen content, will increase the heat radiation, thus lowering the temperature and shortening the palladium side of the bimetal strip to cause bending in that direction. Suitable means may be provided for indicating the position of the end 45. This deflection may, if desired, be amplified mechanically or otherwise, for example, by means of a rack 46 carried at the end 45 of the strip 41, a pivotally mounted pinion 47 engaging the rack 46, and a pointer 48 carried by pinion 47, a scale 49 being provided to cooperate with the pointer 48.

In connection with the measurement of hydrogen percentages the bimetallic strip 41 of Figure 8 may also be employed. However, in this case it is unnecessary for the strip 41 to be tapered and the heating circuit with the leads 42 and 43 may be omitted, if other means are employed to maintain the strip at an adequate temperature for hydrogen absorption. Since hydrogen dissolves in palladium there is an expansion of the metal due to actual change in lattice structure and this expansion, increasing with the concentration of hydrogen, will cause the bimetallic strip 41 to deflect in accordance with the percentages in the gas being analyzed. The absorption of hydrogen takes place particularly at approximately red heat. In order to guard against temperature effects, the heating current is kept constant or other means are employed for assurance of constant temperature. Although I have described the bimetallic indicator in connection with the use of palladium and platinum, it will be understood that my invention is not limited to this specific combination of metals and any two metals may be employed which differ in responsiveness to variations in gas composition.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A method of analyzing gaseous mixtures which comprises non-uniformly heating a piece of metal which will react with one of the gases in the mixture to be analyzed, passing the mixture over the surface of the metal, the range of temperatures chosen for such non-uniform heating extending above and below the point of equilibrium between reaction and non-reaction of the metal with the gas and determining the relative amount of surface of the metal which has reacted with the gas to be measured.

2. A gas analyzer comprising a tapered strip of metal, connections to the metal at the respective ends of the taper from a source of energy whereby non-uniform heating of the tapered strip results, and means with an inlet for directing a flow of gaseous media in a stream beyond the inlet, which is adapted to receive a gaseous mixture to be analyzed, the strip being of a material which, when sufficiently heated, reacts with an active gas in the said mixture and being located beyond the said inlet in the region where the gas flow is directed, thereby exposing the strip to the gaseous mixture, the strip being adapted for comparison of the extent of surface remaining unaffected with the extent of surface affected by the reaction with the active gas in the mixture being analyzed.

3. A gas analyzer comprising a heating unit having progressively different heat output at different parts thereof, with surface metal comprising palladium in thermal relation with said heating unit whereby different portions of the surface metal are raised to different temperatures, means with an inlet for directing the flow of a gaseous media in a stream beyond the inlet, which is adapted to receive gas to be analyzed, the surface metal being located beyond the said inlet in the region where the gas flow is directed thereby exposing the surface metal to the gaseous mixture, whereby the relationship between extent of surface remaining unaffected to the extent of surface reacting with the active gas in the mixture to be analyzed serves as an indication of the composition of the gas.

4. A gas analyzer comprising a member composed of a metal adapted to react with one of the gases in a mixture to be analyzed, connections to said metal from a source of energy for heating a portion of the metal with maximum intensity whereby the member acquires progressively different temperatures at different portions of its surface, said metal member being adapted to have its surface exposed to gas to be analyzed, and means responsive to surface characteristics of said member for comparison of the extent of the surface remaining unaffected with the extent of the surface of the metal reacting with the active gas in the mixture to be analyzed.

5. A gas analyzer comprising a surface metal adapted to react with one of the gases in a mixture to be analyzed, and to have its coefficient of reflection varied thereby, a heater in thermal connection with said surface metal and having maximum intensity at a given portion of said surface metal thereby raising various portions of said surface metal to different temperatures, said surface metal being adapted to be exposed to a gas to be analyzed, a light source projecting light against said surface illuminating it, and light responsive means exposed to said surface and thus responsive to the amount of light reflected by the surface.

6. A gas analyzer comprising a pair of tapered palladium strips and a pair of platinum strips connected to form a Wheatstone bridge with the opposite arms of the bridge composed of like metal, means for applying heating current to opposite corners of the bridge, current responsive means connected as a diagonal arm of the bridge to respond to variations in electrical balance thereof, and means for exposing the surface of the palladium strips to a gas mixture to be analyzed containing a gas which will react chemically with palladium.

7. A gas analyzer comprising four elements connected to form the arms of a Wheatstone bridge, means connecting two diagonally opposite terminals of the bridge for supplying heating current, and a current responsive device connected to the remaining two diagonally opposite terminals of the bridge as a diagonal arm of the bridge responsive to variations in electrical balance thereof, the surface of one of the elements forming the bridge being adapted to be exposed to the gas to be analyzed, said element having a surface composed of a metal which tends to react with one of the gases in the mixture to be analyzed and which has different equilibria reactions at different temperatures, said element comprising a strip tapered so that its temperature from heating current varies progressively along the length thereof.

8. Apparatus responsive to the composition of a mixture of gases comprising four elements connected to form the arms of a Wheatstone bridge, means connecting two diagonally opposite terminals of the bridge for supplying heating current, and a current responsive device connected to the remaining two diagonally opposite terminals of the bridge as a diagonal arm of the bridge responsive to variations in electrical balance thereof, the surface of one of the elements forming the bridge being adapted to be exposed to the mixture of gases to be analyzed, said element having a surface composed of a metal which tends to react with one of the gases in the mixture to be analyzed and which has different equilibria reactions at different temperatures, and which tends to have its thermal emissivity vary in accordance with reaction with the gas whereby the temperature and resistance of said element are modified in response to variations in the gas composition to vary the electrical balance of the bridge.

9. Apparatus responsive to the composition of a mixture of gases comprising a pair of electrical conducting elements composed of metals varying in their tendency to react with the gas content in a mixture to be analyzed, means for passing current through said elements to heat them and promote reaction tending to change the physical characteristics of one of said elements, one of said electrical conducting elements being so shaped as to be heated to progressively different temperatures at different portions of its surface whereby an equilibrium takes place between the portion of the element having the physical characteristics changed by such reaction and the portion of the element being relatively unchanged by such reaction, and electrical comparison means electrically connected to said elements for comparing the electrical characteristics of said elements, whereby variations in gas content, affecting the physical characteristics of one of said elements by reacting therewith, indirectly vary its electrical characteristics and produce an indication in the electrical comparison means.

10. A gas analyzer comprising a tapered strip of bimetal adapted to have a surface exposed to gas to be analyzed, connections from a source of energy to the bimetal for heating the bimetal, a fixed support to which a portion of the strip is attached, a member supported in proximity to an unsupported portion of the strip, and a device responsive to or indicative of relative motion of said unsupported portion of the strip and said supported member, thus being responsive to bending of the bimetal, said bimetallic strip being composed of metals differing in their tendency to react with one of the gases to be measured in the mixture to be analyzed, whereby the variation in effect upon the surface of said latter metal by variations in the gas composition, varies the thermal emissivity, temperature, and physical length of the latter metal to produce bending of the bimetal dependent upon the gas composition.

11. Apparatus responsive to oxygen content of a gas mixture comprising a bimetal strip of palladium and platinum, connections from a source of energy to the strip for heating the strip to progressively different temperatures along its length, said strip being adapted to have its surface exposed to gas to be analyzed, a fixed support to which a portion of the strip is attached, a member supported in proximity to an unsupported portion of the strip and a device responsive to or indicative of relative motion of said unsupported portion of said strip and said member, thus being responsive to bending of the metals, the palladium and platinum in said strip differing in their tendency to react with oxygen in the mixture to be analyzed, whereby the character of the surface of said former metal is affected by a gas composition lying to one side of a predetermined limit at a given temperature thus varying its thermal emissivity, temperature and physical length to produce deflection of the bimetal strip dependent upon the gas composition.

12. A gas analyzer strip composed of a material having an equilibrium reaction with an active gas varying with temperature, said strip having widened terminal portions at the ends adapted to be connected to a source of electrical current for heating and having a tapered portion between the terminals for causing the temperature rise due to heating current to vary progressively along the length of the strip.

FRANCIS J. NORTON.